United States Patent Office 3,384,597
Patented May 21, 1968

3,384,597
SILICATE BASED LASER GLASS
Paul F. De Paolis and Paul B. Mauer, Rochester, N.Y., assignors to Eastman Kodak Company, Rochester, N.Y., a corporation of New Jersey
No Drawing. Filed Aug. 27, 1964, Ser. No. 392,643
11 Claims. (Cl. 252—301.6)

This invention relates to the use of silicate glass as a laser material. More particularly, it relates to the use of a low percentage silicate glass containing oxides of lithium and sodium as a laser host for activating ions including, but not limited to, those of neodymium, ytterbium, holmium and thulium.

Silicate laser glasses presently used show a long fluorescent lifetime compared to other glasses, for example borate laser glasses. However, when fabricated into laser rods, laser efficiency has been inferior to the borate glasses.

In order to obtain this long fluorescent lifetime, these silicate glasses generally contain at least 65 percent of silica by weight and include oxides of potassium and cesium. Applicants have found that by altering the above three ingredients, a much more efficient laser glass can be developed even though some of the fluorescent lifetime is sacrificed. More specifically, applicants have reduced the silica content to between 40% and 60% by weight, and have substituted $Li_2O$ and $Na_2O$ for $K_2O$ and $Cs_2O$. By doing this, applicants have produced a laser glass which is more than twice as efficient as known silicate laser glasses although its fluorescent lifetime is somewhat shorter.

The greater efficiency is believed to be the result of the following three factors:

(1) The addition of the lithium has the effect of improving the strength of the activating ion absorption bands by a factor of two over other silicate laser glasses. Applicants believe that this is accomplished because of a lowering of the symmetry of the placement of the oxygen ions around the activating ions.

(2) The high alkali content of the glass greatly reduces a divalent iron absorption band at 1.06 microns by keeping iron impurities in a trivalent state.

(3) The lower silica content and the lithium and sodium content gives a glass of less viscosity at lower temperatures. This allows better mixing of ingredients and results in a higher optical quality with greater homogeneity.

A laser glass according to the invention can be made with any proportion between 40 and 60 percent silica by weight. However, when between 40 and 45 percent is used, crystallization is somewhat difficult to eliminate, and when between 55 and 60 percent is used, the viscosity is somewhat higher than desired for best results. Therefore, the preferred percentage of silica lies between 45 and 55 percent by weight.

$Li_2O$ should be present in quantities between 3 and 10 percent by weight, with the preferred percentage between 3 and 8 percent since when more than 8 percent is used crystallization again is difficult to control. The actual percentage of $Na_2O$ is not critical above a minimum figure of 2 percent and below 20 percent. Above the minimum amounts of 2 percent $Na_2O$ and 3% $Li_2O$ and up to the maximum of 10 percent $Li_2O$, these two are largely interchangeable.

As is well known in the glass field, other ingredients are important in small amounts to prevent crystallization. There are a large number of these crystallization inhibitors compatible with light crown glass including, but not limited to, BaO, SrO, ZnO, CdO and $La_2O_3$. They should be present in a total amount of at least 5%.

The activating ion is best added as an oxide, for example, $Nd_2O_3$, $Yb_2O_3$, $Tm_2O_3$ or $Ho_2O_3$. Successful lasing is not dependent upon the percent of such ion oxides, but works at least throughout a range of .1% to 20% by weight.

The following examples are merely representative of a large number of formulas within the limits mentioned above. In each case a batch is made up according to the formula and is then processed in the same manner as glasses of this general composition. More specifically, the ingredients in the form of oxides, hydroxides and/or carbonates are thoroughly mixed and then melted at between 1400° C. and 1500° C. The melting is done in a platinum or other inert crucible material over a period of about 4 hours. The batch is then stirred for 2 hours, fired at 1500° C. for 12 hours and stirred again for 3 hours at 1400° C. It is then cooled slowly to 1200° C. poured into preheated molds. The glass is then coarse annealed at 440° C. for 3 hours and cooled at a rate of 25° C. per hour to room temperature. The glass should then be fine annealed at 440° C. for 12 to 18 hours depending on thickness and cooled 1° C. per hour to 275° C. and then 1° C. per hour to room temperature.

Example 1

| | Wt., percent |
|---|---|
| $SiO_2$ | 50 |
| $Li_2O$ | 5 |
| $Na_2O$ | 15 |
| CdO | 8 |
| ZnO | 12 |
| $La_2O_3$ | 6 |

The final 4% is made up of $Nd_2O_3$, $Ho_2O_3$, $Yb_2O_3$ and/or $Tm_2O_3$.

Example 2

| | Wt., percent |
|---|---|
| $SiO_2$ | 50 |
| $Li_2O$ | 7 |
| $Na_2O$ | 10 |
| BaO | 10 |
| SrO | 10 |
| $La_2O_3$ | 12 |

The final 1% is made up of $Nd_2O_3$, $Ho_2O_3$, $Yb_2O_3$ and/or $Tm_2O_3$.

Example 3

| | Wt., percent |
|---|---|
| $SiO_2$ | 45 |
| $Li_2O$ | 4 |
| $Na_2O$ | 11 |
| BaO | 8 |
| ZnO | 8 |
| $La_2O_3$ | 5 |

The final 19% is made up of $Nd_2O_3$, $Ho_2O_3$, $Yb_2O_3$ and/or $Tm_2O_3$.

Example 4

| | Wt., percent |
|---|---|
| $SiO_2$ | 50 |
| $Li_2O$ | 7 |
| $Na_2O$ | 13 |
| BaO | 7 |
| SrO | 8 |
| ZnO | 7 |
| CdO | 3 |

The final 5% is made up of $Nd_2O_3$, $Ho_2O_3$, $Yb_2O_3$ and/or $Tm_2O_3$.

The above glasses after fusing are made into laser rods. At the present time, this is generally accomplished by making the optically finished (flat or curved) ends of the rods reflective. Usually this is accomplished by coating with a metallic or optical interference material. Other means, however, have been developed, such as using total internal reflection of more than two surfaces of a cubically shaped rod.

By the use of the term laser rod, applicants do not intend to limit themselves to any particular shape of laser rod or type of radiation propagation within the rod. Rather, applicants intend to include all laser rods now or hereinafter designed which use applicants discovery that the hereinbefore mentioned type of glass is an especially efficient laser material.

The invention has been described in considerable detail with particular reference to certain preferred embodiments thereof, but it will be understood that variations and modifications can be effected within the spirit and scope of the invention as described hereinbefore and as defined in the appended claims.

We claim:

1. A glass laser material consisting essentially of, by weight, between 40% and 60% $SiO_2$, between 3% and 10% $Li_2O$, between 2% and 20% $Na_2O$, at least 5% other crown glass crystallization inhibiting oxides and between .1% and 20% of at least one oxide at at least one type of activating ion selected from the group consisting of $Nd_2O_3$, $Ho_2O_3$, $Yb_2O_3$ and $Tm_2O_3$.

2. A glass laser rod containing activating ions homogeneously integrated in a light crown glass host material, said glass laser rod consisting essentially of, by weght, between 45% and 55% $SiO_2$, between 3% and 8% $Li_2O$ between 2% and 20% $Na_2O$, at least 5 percent other crown glass crystallization inhibiting oxides, and between .1 percent and 20 percent of an activating ion oxide selected from the group consisting of $Nd_2O_3$, $Ho_2O_3$, $Yb_2O_3$ and $Tm_2O_3$.

3. A glass laser material according to claim 1 wherein the oxide of the activating ion is $Nd_2O_3$.

4. A glass laser material according to claim 1 wherein the oxide of the activating ion is $Ho_2O_3$.

5. A glass laser material according to claim 1 wherein the oxide of the activating ion is $Yb_2O_3$.

6. A glass laser material according to claim 1 wherein the oxide of the activating ion is $Tm_2O_3$.

7. A glass laser rod according to claim 2 wherein the glass host material consists essentially of the following formulation by weight:

| | Wt., percent |
|---|---|
| $SiO_2$ | 50 |
| $Li_2O$ | 5 |
| $Na_2O$ | 15 |
| CdO | 8 |
| ZnO | 12 |
| $La_2O_3$ | 6 | and 4% of at least one oxide selected from the group consisting of $Nd_2O_3$, $Yb_2O_3$, $Tm_2O_3$ and $Ho_2O_3$.

8. A glass laser rod according to claim 2 wherein the glass host material consists essentially of the following formulation by weight:

| | Wt., pecrent |
|---|---|
| $SiO_2$ | 50 |
| $Li_2O$ | 7 |
| $Na_2O$ | 10 |
| BaO | 10 |
| SrO | 10 |
| $La_2O_3$ | 12 | and 1% of at least one oxide selected from the group consisting of $Nd_2O_3$, $Yb_2O_3$, $Tm_2O_3$ and $Ho_2O_3$.

9. A glass laser rod according to claim 2 wherein the glass host material consists essentially of the following formulation by weight:

| | Wt., percent |
|---|---|
| $SiO_2$ | 45 |
| $Li_2O$ | 4 |
| $Na_2O$ | 11 |
| BaO | 8 |
| ZnO | 8 |
| $La_2O_3$ | 5 | and 19% of at least one oxide selected from the group consisting of $Nd_2O_3$, $Ho_2O_3$, $Yb_2O_3$ and $Tm_2O_3$.

10. A glass laser rod according to claim 2 wherein the glass host material consists essentially of the following formulation by weight:

| | Wt., percent |
|---|---|
| $SiO_2$ | 50 |
| $Li_2O$ | 7 |
| $Na_2O$ | 13 |
| BaO | 7 |
| SrO | 8 |
| ZnO | 7 |
| CdO | 3 | and 5% of at least one oxide selected from the group consisting of $Nd_2O_3$, $Ho_2O_3$, $Yb_2O_3$ and $Tm_2O_3$.

11. A glass laser rod according to claim 2 wherein the glass host material consists essentially of the following formulation by weight:

| | Wt., percent |
|---|---|
| $SiO_2$ | 50 |
| $Li_2O$ | 7 |
| $Na_2O$ | 10 |
| BaO | 10 |
| SrO | 10 |
| $La_2O_3$ | 12 |
| $Nd_2O_3$ | 1 |

References Cited

UNITED STATES PATENTS 2,224,516  12/1940  Kerstan et al. ____ 252—301.4

OTHER REFERENCES

Kurkjian et al.: The Absorption and Fluorescence Spectra of Trivalent Europium in Silicate Glasses, Physics and Chemistry of Glasses, volume 4, No. 6, December 1963, pages 239–246.

Hirayama et al.: The Effect of Neodymium Environment on its Absorption and Emission Characteristics in Glass Physics and Chemistry of Glasses, volume 5, No. 2, April 1964, pages 44–51.

Snitzer: Optical Maser Action of $Nd_3$ in a Barium Crown Glass, Physical Review Letters, volume 7, No. 12, Dec. 15, 1961, pages 444–446.

Proceedings of The IRE October 1962, "Correspondence," pages 2114–15.

Kroger: Some Aspects of the Luminescence of Solids, 1948, pages 293 and 298.

TOBIAS E. LEVOW, *Primary Examiner.*

ROBERT D. EDMONDS, *Examiner.*